March 13, 1928.

I. C. JENNINGS 1,662,250

METHOD AND APPARATUS RELATING TO MOTOR DRIVEN PUMPS

Filed June 11, 1926

INVENTOR
Irving C. Jennings
BY
Southgate Fay + Hawley
ATTORNEYS

March 13, 1928.
I. C. JENNINGS
1,662,250
METHOD AND APPARATUS RELATING TO MOTOR DRIVEN PUMPS
Filed June 11, 1926  3 Sheets-Sheet 2
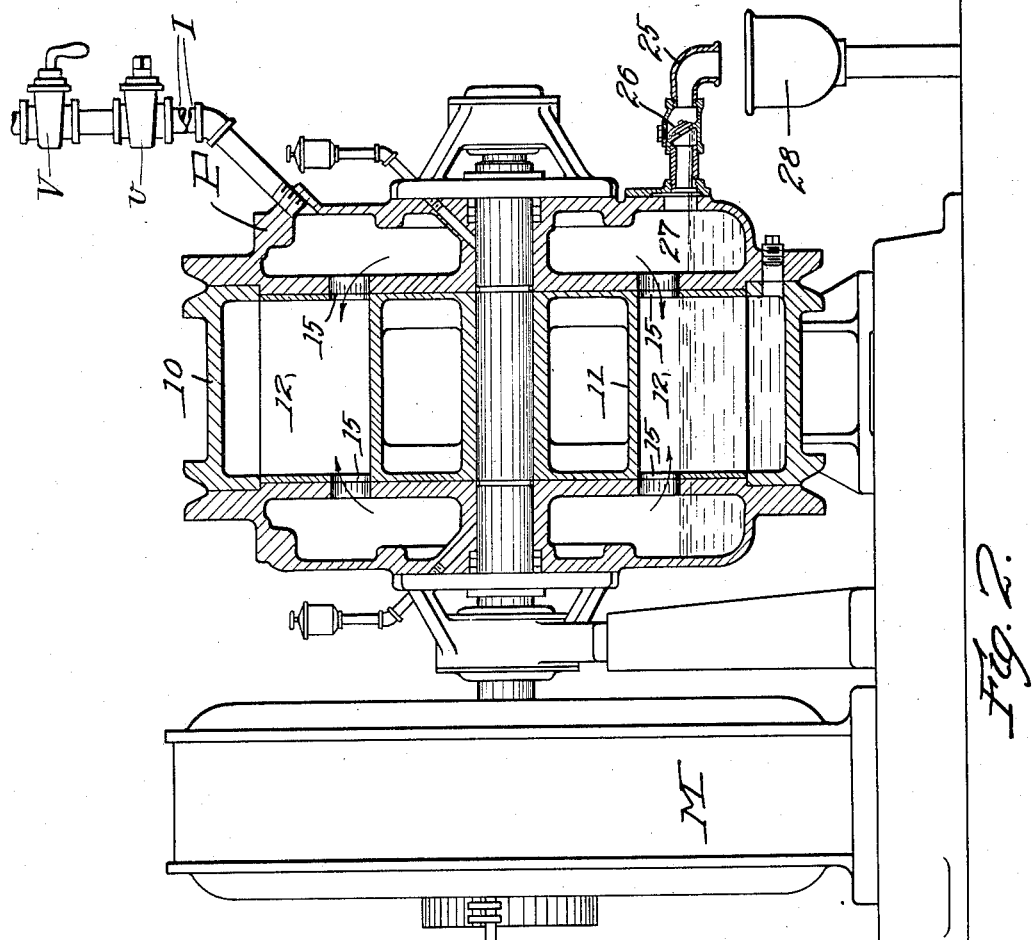
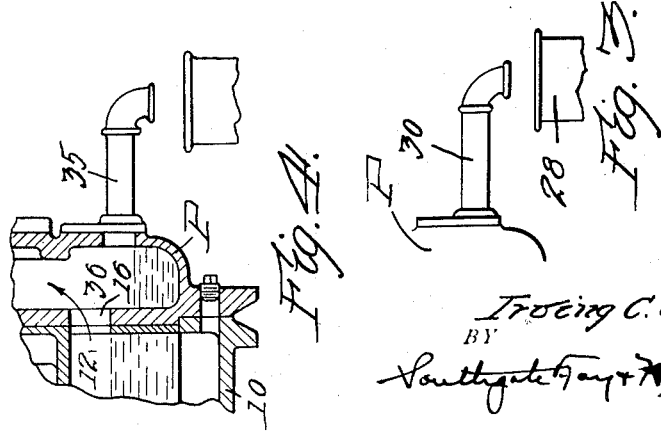
INVENTOR
Irving C. Jennings
BY
ATTORNEYS Patented Mar. 13, 1928.

1,662,250

UNITED STATES PATENT OFFICE.

IRVING C. JENNINGS, OF SOUTH NORWALK, CONNECTICUT.

METHOD AND APPARATUS RELATING TO MOTOR-DRIVEN PUMPS.

Application filed June 11, 1926. Serial No. 115,373.

This invention relates particularly to motor driven pumps of the type in which a liquid is employed to develop the pumping action. Such pumps are most commonly used to remove air or gases from a closed system, thereby producing a low pressure or vacuum in the system or for compressing air or gases and discharging them against a higher pressure. In either case, water is commonly employed for the pumping action. It is frequently desirable to drive such pumps by directly connecting them with slow speed electric motors, and synchronous motors have been found particularly well adapted for this purpose. These large slow speed synchronous motors are very efficient in operation after being brought up to full speed and they possess marked ability to maintain a correct power factor but they are somewhat lacking in starting torque. Pumps driven by such motors are slow in responding and in picking up speed when they are started up, after the pump has been standing at rest.

It is one object of my invention to provide means for reducing the starting load upon a pump of this general type, thereby increasing the ease of starting such pumps, particularly when of large size and when driven by slow speed electric motors.

My invention further relates to an improved method of operation by which these results are attained, said method involving the unloading of the pump as it comes to rest, so that the pump may be started up under very light load and so that it will quickly come up to full speed before full load is carried by the pump.

Another object of my invention relates to the provision of an improved method of operating a motor driven pump by which the ease of starting is much increased.

In the preferred form of my invention, I provide means for unloading the pump as it comes to rest, preferably by removing a large portion of the operating water or other liquid from the pump casing. The pump may then be started in an idle or substantially inoperative condition and picks up its load as the supply of liquid in the pump is gradually increased to the amount required for normal operation.

Preferably also I provide means by which the unloading and reloading of the pump are accomplished automatically and without attention by the operator, although certain of the advantages of my invention may be attained by manual control of the unloading and reloading of the pump.

My invention further relates to arrangements and combinations of parts which will be hereinafter described and more particularly pointed out in the appended claims.

A preferred form of the invention is shown in the drawings in which

Fig. 2 is a similar view but showing the pump arranged so that the unloading may be accomplished automatically;

Fig. 3 shows a modified structure adapted for use with a pressure pump;

Fig. 4 is a partial sectional side elevation showing a further modification of my invention;

Figure 1:
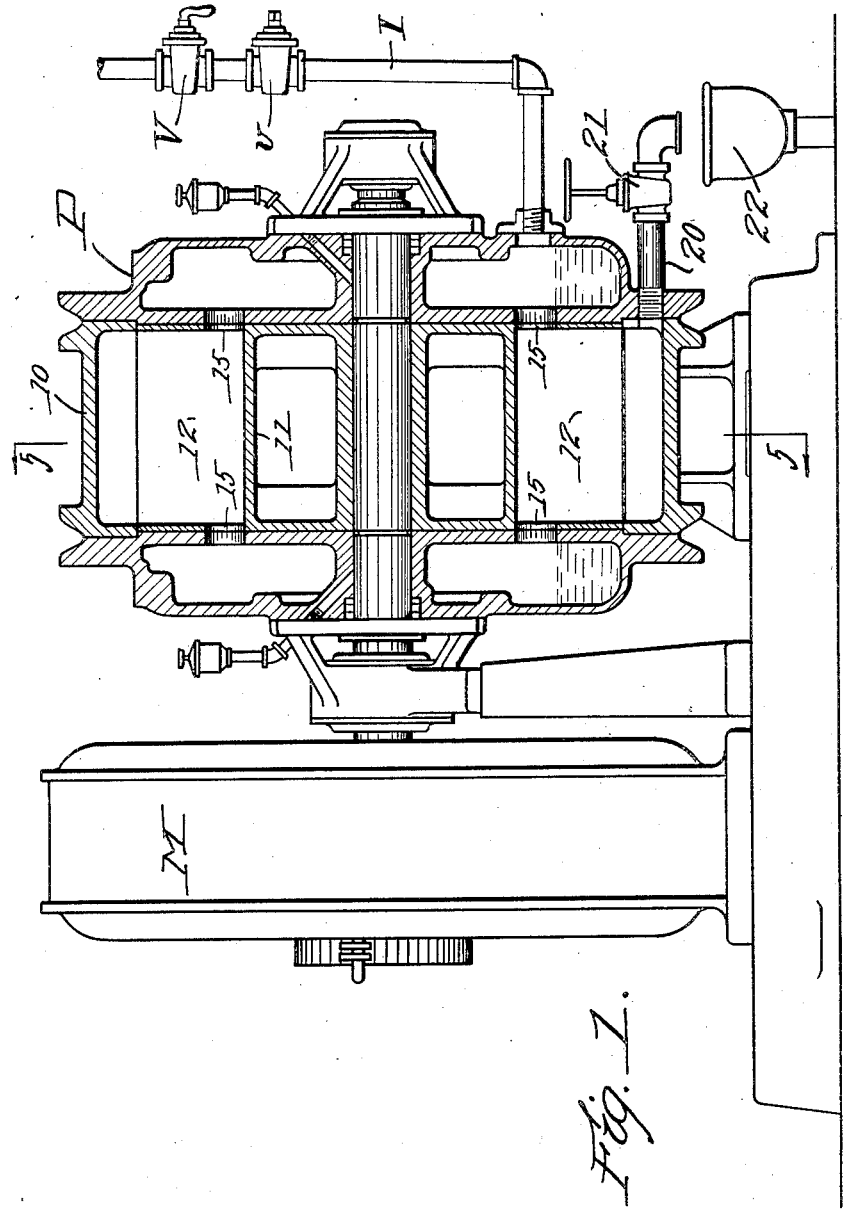
Fig. 1 is a side elevation, partly in section, of a large motor driven pump adapted to be unloaded and reloaded by manual control.

Referring to the drawings, I have shown a commercial type of air pump P directly connected to a large electric motor M which is preferably of the synchronous type, but may be of any powerful slow speed design. The pump P is of the general type shown and described in the prior patent to Nash, No. 1,091,529, granted March 31, 1914, and comprises a casing 10 which is preferably of the substantially elliptical section indicated in Figs. 5 and 6. A rotor 11 is mounted to rotate freely in the casing 10 and is provided with a series of blades or vanes 12 extending across the pump chamber from one side wall to the other thereof.

Figure 5:
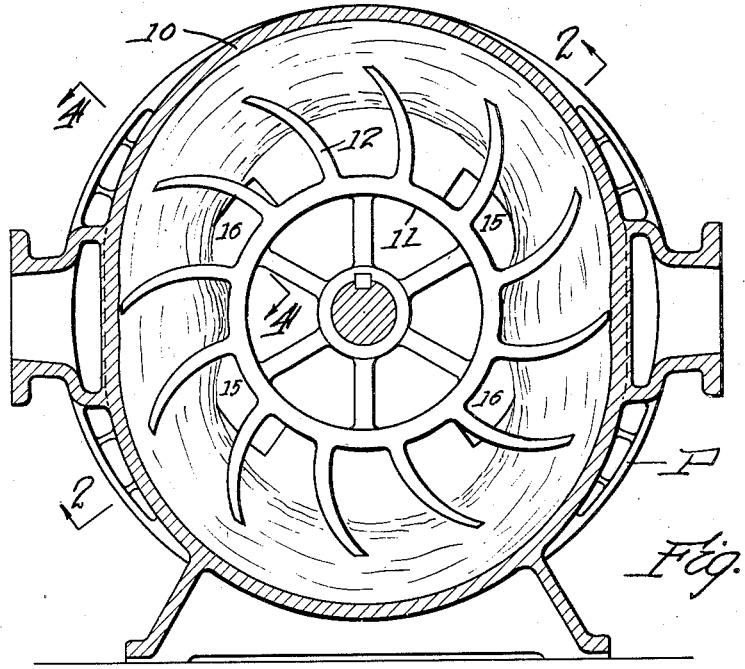
Fig. 5 is a sectional end view, taken along the line 5—5 in Fig. 1 and showing the water supply when the pump is in normal operation.
Figure 6:
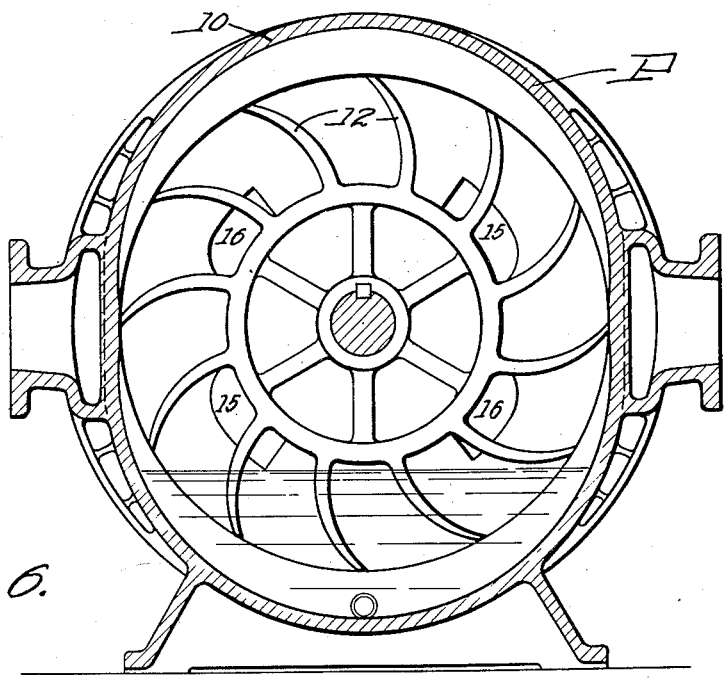
Fig. 6 is a similar view showing the pump substantially unloaded as the pump is brought to rest.

The casing 10 is provided with oppositely disposed inlet ports 15 and similarly disposed outlet ports 16, said inlet and outlet ports being spaced substantially 90° apart. When the pump is in operation, the casing 10 is largely filled with water or some other operating liquid, as shown in Fig. 5, and the peculiar shape of the casing 10 causes the liquid to be alternately forced into the pocket formed by the blades 12 and to thereafter move outwardly therefrom, thus producing in the pocket substantially the effect of a water piston. As the rotor revolves, portions of air or gas are drawn in through the inlet ports 15 and are thereafter forced out through the outlet ports 16.

The operation is continuous and very efficient and for a more complete description reference is made to the prior patent to Nash above identified.

The pump may be operated either as a vacuum pump, drawing in air or gas from a low pressure system and ejecting it at atmospheric pressure, or it may be used as a compressor, taking in air or gas at atmospheric pressure and delivering the same at a higher pressure.

When such a pump is brought to rest, practically all of the water in the casing 10 will flow to the lower part of the casing, as there is necessarily some clearance between the ends of the rotor and the side walls of the pumping chamber, which clearance permits downward flow of the water.

If a drain pipe 20 (Fig. 1) is connected to a low point in the casing 10 and a shut-off valve 21 in the drain pipe is manually opened after the pump has been brought to rest, any desired portion of the pumping liquid may be discharged to a waste pipe 22. When the pump is again started in operation, the pump will start under light load as the air pump has no pumping action until supplied with its operating liquid. The liquid necessary for operation may be gradually added after the pump has come up to speed, this operating or make-up water being taken from any suitable source of supply, and introduced into the pump at any suitable point. This water can be put in by any means, either automatically or by hand, the usual method being to connect it to a source of water under pressure and leave the valve "cracked", allowing water to continue to run, if desired, while the pump is shut down, or the water may be shut off and turned on again before starting the pump. In Fig. 1, an inlet connection I, connected to a suitable source of supply, not shown, is illustrated, this connection having in it two valves, one valve V being manually controlled through a handle when desired, and the other valve v being adapted for regulation by a wrench. The valve to be regulated by a wrench is set for once and all according to the pressure and the other valve is manipulated when the pump is started and stopped. Of course, if desired, one of the valves may be omitted and the device will function equally well. In Fig. 2 a similar arrangement is shown, the connection being to the upper portion of the pump chamber rather than to the lower portion. Also if desired any suitable automatic means may be used in lieu of the dual valve arrangement, although in the arrangement shown, if one valve is omitted and the other valve left "cracked" the operation may be substantially automatic.

In Fig. 2, I have shown the air pump arranged for operation as a vacuum pump and having a drain pipe 25 provided with an outwardly opening check valve 26. The drain pipe 25 is connected into inlet passages 27, from which air flows to the pump chamber through the inlet ports 15. When used as a vacuum pump, the outlet ports are always open to the atmosphere and the pressure within the pump falls quickly to atmospheric pressure as soon as the pumping action ceases. The operating liquid then flows automatically through the drain pipe 25 into the waste pipe 28, but the check valve 26 prevents air from being drawn into the pump chamber when pumping operations are resumed.

If the pump is being employed as a compressor, the inlet passage 27 will be at atmospheric pressure and the check valve 26 may be omitted, using a plain open discharge pipe 30 as indicated in Fig. 3.

With either construction, the operating water will be automatically discharged from the pump as soon as the pumping operation ceases, but may be gradually restored after the pump has been again placed in operation, manually or automatically as described above.

When the pump is employed for low pressure or vacuum work, a similar result may be attained by connecting an open discharge pipe 35 to a passage 36 (Fig. 4) in the pump casing which is connected to the discharge or outlet ports 16. This construction is permissible with vacuum pumps, as the discharge side of the pump is at atmospheric pressure but this location of an open discharge pipe is not suitable for pumps used as compressors, as it would vent the high pressure discharge side of the pump. Any check valve which would prevent this outward discharge of high-pressure air through the pipe 35 would also prevent drainage of water therefrom. But a manually controlled discharge, as shown in Fig. 1, may be connected to the discharge side of a pump used as a compressor, if so desired.

Having thus described my invention, it will be seen that I have provided means for either manually or automatically removing the operating liquid from a pump in which water or other liquid is employed for the pumping action, thus unloading the pump and permitting it to be started in operation in substantially idle or inoperative condition while at the same time the load may be gradually built up after full speed is attained.

While I have described my invention particularly applied to pumps in which water or other liquids are employed for the pumping action, the invention is also applicable in certain respects to other types of pumps handling liquids or involving the use of liquids in their operation.

Having thus described my invention and the advantages thereof I do not wish to be limited to the details herein disclosed otherwise than as set forth in the claims, but what I claim is:—

1. The method of operating a motor driven gas pump employing a liquid for its pumping action, which consists in unloading the pump by removing a substantial portion of pumping liquid when the pump is stopped, starting the pump with a greatly reduced supply of operating liquid therein, and thereafter gradually restoring the operating liquid as the pump attains normal operating speed.

2. The method of operating a motor driven gas pump employing a liquid for its pumping action, which consists in rendering the pump substantially inoperative by removing the greater part of its operating liquid when the pump comes to rest, starting the pump with a greatly reduced supply of operating liquid therein, and thereafter gradually restoring the operating liquid and thereby taking up the load.

3. The method of improving the starting efficiency of a fluid pumping apparatus employing a liquid in its pumping action which consists in removing the greater part of the operating liquid from the pump when the operation of the pump is interrupted, and in thereafter gradually restoring said liquid when the pump is again in operation.

4. Apparatus for pumping air or gas, comprising a pump employing liquid for its pumping action, means to drive said pump, and means to unload said pump by removing a large part of the operating liquid therefrom when the pump is stopped, said liquid being thereafter gradually restored.

5. Apparatus for pumping air or gas, comprising a pump employing liquid for its pumping action, an electric motor to rotate said pump, and means to unload said pump by removing a large part of the operating liquid therefrom when the pump is stopped, said liquid being thereafter gradually restored.

6. Apparatus for pumping air or gas, comprising a pump employing liquid for its pumping action, a direct-connected, slow-speed electric motor to rotate said pump, and means to unload said pump by removing a large part of the operating liquid therefrom when the pump is stopped, said liquid being thereafter gradually restored.

7. Apparatus for pumping air or gas, comprising a pump employing liquid for its pumping action, a direct-connected, synchronous motor to rotate said pump, and means to unload said pump by removing a large part of the operating liquid therefrom when the pump is stopped, said liquid being thereafter gradually restored.

8. Apparatus for pumping air or gas, comprising a pump employing liquid for its pump action, a motor to drive said pump, said pump having a casing, and having an outlet in said casing effective to discharge a large part of the operating liquid therefrom when the pump is stopped.

9. In a vacuum pumping apparatus, a gas-exhausting pump employing a liquid for its pumping action, said pump having a casing with inlet and outlet ports, and said casing having a discharge passage connected to said inlet ports and permitting escape of operating liquid therefrom when the pump comes to rest and means to prevent air from flowing inward through said discharge passage.

10. In a vacuum pumping apparatus, a gas-exhausting pump employing a liquid for its pumping action, said pump having a casing with inlet and outlet ports, and said casing having a discharge passage connected to said inlet ports and permitting escape of operating liquid therefrom when the pump comes to rest and a check valve to prevent air from flowing inward through said discharge passage.

11. In a vacuum pumping apparatus, a gas-exhausting pump employing a liquid for its pumping action, said pump having a casing with inlet and outlet ports, and said casing having a discharge passage connected to said outlet ports and permitting escape of operating liquid therefrom when the pump comes to rest.

In testimony whereof I have hereunto affixed my signature.

IRVING C. JENNINGS.